US012559614B2

(12) United States Patent (10) Patent No.: US 12,559,614 B2
Kawai (45) Date of Patent: Feb. 24, 2026

(54) FLUORINATED COPOLYMER COMPOSITION AND CROSSLINKED RUBBER ARTICLE

(71) Applicant: AGC Inc., Tokyo (JP)

(72) Inventor: Tsuyoshi Kawai, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/872,132

(22) Filed: Jul. 25, 2022

(65) Prior Publication Data

US 2022/0356338 A1 Nov. 10, 2022

Related U.S. Application Data

(63) Continuation of application No. PCT/JP2021/014996, filed on Apr. 9, 2021.

(30) Foreign Application Priority Data

Apr. 13, 2020 (JP) ................................. 2020-071455

(51) Int. Cl.
| | |
|---|---|
| *C08L 27/18* | (2006.01) |
| *C08F 214/26* | (2006.01) |
| *C08F 216/14* | (2006.01) |
| *C08K 5/50* | (2006.01) |
| *C08K 5/5397* | (2006.01) |

(52) U.S. Cl.
CPC .......... *C08L 27/18* (2013.01); *C08F 214/262* (2013.01); *C08F 214/265* (2013.01); *C08F 216/1408* (2013.01); *C08F 216/1458* (2013.01); *C08K 5/50* (2013.01); *C08K 5/5397* (2013.01)

(58) Field of Classification Search
CPC ....................................................... C08L 27/18
See application file for complete search history.

(56) References Cited

U.S. PATENT DOCUMENTS

| | | | | | |
|---|---|---|---|---|---|
| 4,713,418 A | * | 12/1987 | Logothetis | .............. | C08L 27/18 525/200 |
| 5,677,389 A | * | 10/1997 | Logothetis | ................ | C08F 8/00 525/326.3 |

| | | | | | |
|---|---|---|---|---|---|
| 6,114,452 A | * | 9/2000 | Schmiegel | ................ | C08F 8/00 525/218 |
| 6,300,446 B1 | * | 10/2001 | Miwa | ...................... | C08L 27/12 526/345 |
| 6,465,576 B1 | | 10/2002 | Grootaert et al. | | |
| 8,367,776 B2 | * | 2/2013 | Noguchi | ................ | C08L 27/18 526/248 |
| 9,365,712 B2 | * | 6/2016 | Gurevich | ................ | C08K 5/18 |
| 2003/0191247 A1 | | 10/2003 | Kawasaki et al. | | |
| 2004/0122182 A1 | | 6/2004 | Kawasaki et al. | | |
| 2006/0093827 A1 | * | 5/2006 | Funaki | .................... | B32B 27/08 428/522 |
| 2016/0137828 A1 | | 5/2016 | Gurevich et al. | | |
| 2017/0130009 A1 | * | 5/2017 | Hosoda | ................... | B32B 27/08 |

FOREIGN PATENT DOCUMENTS

| | | |
|---|---|---|
| JP | 06-306236 A | 11/1994 |
| JP | 7-506602 A | 7/1995 |
| JP | 2010-037558 A | 2/2010 |
| JP | 2011-16956 A | 1/2011 |
| JP | 2015-096572 A | 5/2015 |
| JP | 2016-124909 A | 7/2016 |
| JP | 2019-214641 A | 12/2019 |
| KR | 10-1584579 B1 | 1/2016 |
| WO | WO 00/29479 A1 | 5/2000 |
| WO | WO 02/00781 A1 | 1/2002 |
| WO | WO 2009/119487 A1 | 10/2009 |

OTHER PUBLICATIONS

Trihexylphosphine Oxide flyer (Year: 2017).*
Trioctylphosphine flyer (Year: 2017).*
Safety Data Sheet (SDS), dated Aug. 9, 2022 (200131JP02), pp. 1-5.
International Search Report issued Jun. 22, 2021 in PCT/JP2021/014996 filed on Apr. 9, 2021, 3 pages.

* cited by examiner

*Primary Examiner* — Irina Krylova
(74) *Attorney, Agent, or Firm* — Oblon, McClelland, Maier & Neustadt, L.L.P.

(57) ABSTRACT

To provide a fluorinated copolymer composition whereby a crosslinked rubber article which has a low compression set at high temperature and which is not broken after compression can be formed, and a crosslinked rubber article. The fluorinated copolymer composition of the present invention comprises a fluorinated copolymer (A) having units having a nitrile group and units based on tetrafluoroethylene, a fluorinated copolymer (B) having units having at least one functional group selected from the group consisting of a group having a carbonyl group, a hydroxy group, an epoxy group and an isocyanate group and units based on tetrafluoroethylene, and a crosslinking agent.

11 Claims, No Drawings

FLUORINATED COPOLYMER COMPOSITION AND CROSSLINKED RUBBER ARTICLE

TECHNICAL FIELD

The present invention relates to a fluorinated copolymer composition and a crosslinked rubber article.

BACKGROUND ART

Crosslinked rubber articles having a fluorinated copolymer crosslinked are excellent in heat resistance, chemical resistance, oil resistance, weather resistance, etc. and thus are widely used in the fields of vehicles, ships, aircraft, general machinery, construction, etc., as sealing materials (e.g. O-rings, packing, oil seals, gaskets) and cushioning materials.

As a fluorinated copolymer composition for producing such crosslinked rubber articles, Patent Document 1 discloses a fluorinated rubber composition comprising a fluororubber obtained by copolymerizing vinylidene fluoride with at least one ethylenic unsaturated monomer copolymerizable with it, an organic peroxide, at least one member selected from a bivalent metal hydroxide and a bivalent metal oxide, and an organic phosphorus compound.

PRIOR ART DOCUMENT

Patent Document

Patent Document 1: JP-A-H06-306236

DISCLOSURE OF INVENTION

Technical Problem

In recent years, there has been a demand for improving properties of crosslinked rubber articles in various fields. Specifically, crosslinked rubber articles having a low compression set at high temperature have been demanded. To respond to such demands, the present inventor has evaluated a crosslinked rubber article disclosed in Patent Document 1, and as a result found that there is room for improvement on a compression set when a compression set test is carried out at high temperature (hereinafter referred to also as "compression set at high temperature").

Further, as another property required for crosslinked rubber articles, it may be mentioned that crosslinked rubber articles will not be broken, after compression.

The object of the present invention is to provide a fluorinated copolymer composition whereby a crosslinked rubber article which has a low compression set at high temperature and which is not broken after compression can be formed, and a crosslinked rubber article.

Solution to Problem

As a result of an extensive study on the above problem, the present inventor has found that by using a fluorinated copolymer composition comprising a fluorinated copolymer (A) having units having a nitrile group and units based on tetrafluoroethylene, a fluorinated copolymer (B) having units having a specific functional group and units based on tetrafluoroethylene, and a crosslinking agent, the desired effects can be obtained, and thus has arrived at the present invention.

That is, the present inventor has found that the above problem can be solved by the following construction.

[1] A fluorinated copolymer composition comprising a fluorinated copolymer (A) having units having a nitrile group and units based on tetrafluoroethylene, a fluorinated copolymer (B) having units having at least one functional group selected from the group consisting of a group having a carbonyl group, a hydroxy group, an epoxy group and an isocyanate group and units based on tetrafluoroethylene, and a crosslinking agent.

[2] The fluorinated copolymer composition according to [1], wherein the fluorinated copolymer (A) further has units based on a perfluoro(alkyl vinyl ether).

[3] The fluorinated copolymer composition according to [1] or [2], wherein the fluorinated copolymer (A) is a perfluoropolymer.

[4] The fluorinated copolymer composition according to any one of [1] to [3], wherein the fluorinated copolymer (B) further has units based on a perfluoro(alkyl vinyl ether).

[5] The fluorinated copolymer composition according to any one of [1] to [4], wherein the content of the fluorinated copolymer (B) is 50 parts by mass or lower to 100 parts by mass of the fluorinated copolymer (A).

[6] The fluorinated copolymer composition according to any one of [1] to [5], wherein the content of the fluorinated copolymer (B) is 30 parts by mass or lower to 100 parts by mass of the fluorinated copolymer (A).

[7] The fluorinated copolymer composition according to any one of [1] to [6], wherein the content of the fluorinated copolymer (B) is 2 parts by mass or higher to 100 parts by mass of the fluorinated copolymer (A).

[8] The fluorinated copolymer composition according to any one of [1] to [7], wherein the crosslinking agent is a compound having two or more amino groups.

[9] The fluorinated copolymer composition according to any one of [1] to [8], wherein the content of the crosslinking agent is from 0.3 to 10 parts by mass to 100 parts by mass of the fluorinated copolymer (A).

[10] The fluorinated copolymer composition according to any one of [1] to [9], which further contains a phosphorus compound having a melting point of 60° C. or lower.

[11] The fluorinated copolymer composition according to [10], wherein the melting point of the phosphorus compound is 35° C. or lower.

[12] The fluorinated copolymer composition according to [10] or [11], wherein the phosphorus compound is a trialkylphosphine or a trialkylphosphine oxide.

[13] The fluorinated copolymer composition according to any one of [10] to [12], wherein the content of the phosphorus compound is 0.20 part by mass or higher to 100 parts by mass of the fluorinated copolymer (A).

[14] The fluorinated copolymer composition according to any one of [10] to [13], wherein the content of the phosphorus compound is 5 parts by mass or lower to 100 parts by mass of the fluorinated copolymer (A).

[15] A crosslinked rubber article which is obtained by crosslinking the fluorinated copolymer (A) in the fluorinated copolymer composition as defined in any one of [1] to [14].

Advantageous Effects of Invention

According to the present invention, it is possible to provide a fluorinated copolymer composition whereby a crosslinked rubber article which has a low compression set at high temperature and which is not broken after compressed, can be formed, and a crosslinked rubber article.

DESCRIPTION OF EMBODIMENTS

The meanings of terms in the present invention are as follows.

A "unit" is a generic name for an atomic group directly formed by polymerization of a monomer and derived from a single molecule of the above monomer, and an atomic group obtained by chemical conversion of a portion of the above atomic group. "Units based on a monomer" may hereinafter be simply referred to also as "units".

"Rubber" means rubber showing properties defined by JIS K6200 (2008), and is distinguished from "resin".

"Melting point" means a temperature corresponding to the maximum value of a melting point peak measured by a differential scanning calorimetry (DSC) method.

"Boiling point" is a value measured by an equilibrium reflux boiling point method, specifically a value measured in accordance with JIS K2233: 2017, 8.1. In a case where the pressure is mentioned after the boiling point, the boiling point is a value measured under the pressure. Unless otherwise specified, the boiling point is a value obtained by converting a value measured by the method of JIS K2233: 2017, 8.1 to a value of a boiling point at 760 mmHg.

(Meth)acrylate is a generic name of acrylate and methacrylate, and "(meth)acryloyl" is a generic name of acryloyl and methacryloyl.

[Fluorinated Copolymer Composition]

The fluorinated copolymer composition of the present invention (hereinafter referred to also as "the present composition") comprises a fluorinated copolymer (A) (hereinafter referred to also as "copolymer (A)") having units having a nitrile group and units based on tetrafluoroethylene, a fluorinated copolymer (B) (hereinafter referred to also as "copolymer (B)") having units having at least one functional group selected from the group consisting of a group having a carbonyl group, a hydroxy group, an epoxy group and an isocyanate group and units based on tetrafluoroethylene, and a crosslinking agent.

The crosslinked rubber article obtained by using the present composition has a low compression set at high temperature (for example, a compression set when a compression set test is carried out after storing a crosslinked rubber article at 300° C. for 70 hours) and is not broken after compression.

The details of the reason for this have not been clarified, but the following reasons are estimated. The break after compression is considered to occur at an interface between two fluorinated copolymers in the composition. In the crosslinked rubber article obtained by using the present composition, by using a fluorinated copolymer (B) having units having at least one functional group selected from the group consisting of a group having a carbonyl group, a hydroxy group, an epoxy group and an isocyanate group, chemical bonds are formed at an interface between the copolymer (B) and the copolymer (A), whereby the crosslinked rubber article is less likely to be broken.

Further, it is considered that the compression set at high temperature is made to be low because of the function of the chemical bonds between the copolymer (A) and the copolymer (B).

<Copolymer (A)>

The copolymer (A) is a polymer having units having a nitrile group and units based on tetrafluoroethylene (hereinafter referred to also as "TFE"). If elongated, the copolymer (A) itself cannot return to its former state, however, if crosslinked, the property to return to its former state is improved, that is, the property of a rubber is obtained.

The copolymer (A) preferably further has units based on a perfluoro(alkyl vinyl ether) (hereinafter referred to also as "PAVE"), in that the effects of the present invention will be superior.

The units having a nitrile group are units based on a monomer having a nitrile group (hereinafter referred to also as "$R_{CN}$"). RCN preferably has a fluorine atom and is particularly preferably a monomer represented by the formula (1), in that the effects of the present invention will be superior.

$$CR^{11}R^{12}=CR^{13}-R^{14}-CN \qquad (1)$$

In the formula (1), $R^{11}$, $R^{12}$ and $R^{13}$ each independently represent a hydrogen atom, a fluorine atom or a methyl group, and $R^{14}$ represents a $C_{1-10}$ bivalent perfluorohydrocarbon group or a group having an etheric oxygen atom at a terminal or in a carbon-carbon bond of said perfluorohydrocarbon group.

In that the polymerization reactivity of $R_{CN}$ will be superior, it is preferred that $R^{11}$, $R^{12}$ and $R^{13}$ are fluorine atoms or hydrogen atoms, it is more preferred that all of $R^{11}$, $R^{12}$ and $R^{13}$ are fluorine atoms or all of them are hydrogen atoms, and from the point that the releasing property and the heat resistance of a crosslinked rubber article will be superior, it is particularly preferred that all of $R^{11}$, $R^{12}$ and $R^{13}$ are fluorine atoms.

$R^{14}$ may be linear, branched or cyclic, preferably linear or branched. The number of carbon atoms in $R^{14}$ is preferably from 2 to 8, more preferably from 3 to 7, further preferably from 3 to 6, particularly preferably from 3 to 5.

$R^{14}$ may have an etheric oxygen atom or may have no etheric oxygen atom, however, $R^{14}$ preferably has an etheric oxygen atom, in that the rubber properties will be superior. The number of etheric oxygen atoms in $R^{14}$ is preferably from 1 to 3, particularly preferably 1 or 2.

As specific examples of the monomer represented by the formula (1), $CF_2=CFOCF_2CF(CF_3)OCF_2CF_2CN$ (hereinafter referred to also as "8CNVE"), $CF_2=CFO(CF_2)_5CN$ (hereinafter referred to also as "MV5CN"), $CF_2=CFOCF_2CF_2CF_2OCF(CF_3)CN$ and $CF_2=CFO(CF_2)_3CN$ may be mentioned, and 8CNVE and MV5CN are preferred, in that the releasing property and the heat resistance of a crosslinked rubber article will be superior.

PAVE units are units based on a perfluoro(alkyl vinyl ether).

PAVE is preferably a monomer represented by the formula (2), in that the polymerization reactivity and the rubber properties will be excellent.

$$CF_2=CF-O-R^{f2} \qquad (2)$$

In the formula (2), $R^{f2}$ represents a $C_{1-10}$ perfluoroalkyl group. The number of carbon atoms in $R^{f2}$ is preferably from 1 to 8, more preferably from 1 to 6, further preferably from 1 to 5, particularly preferably from 1 to 3, in that the polymerization reactivity will be superior.

The perfluoroalkyl group may be linear or branched.

As specific examples of PAVE, perfluoro(methyl vinyl ether) (hereinafter referred to also as "PMVE"), perfluoro(ethyl vinyl ether) (hereinafter referred to also as "PEVE") and perfluoro(propyl vinyl ether) (hereinafter referred to also as "PPVE") may be mentioned, and among them, PMVE and PPVE are preferred.

The copolymer (A) may have units based on a monomer other than the above-mentioned monomers (hereinafter referred to also as "other monomer"). As specific examples of such other monomer, vinylidene fluoride (hereinafter referred to also as "VdF"), hexafluoropropylene (hereinafter referred to also as "HFP"), chlorotrifluoroethylene, a monomer having two or more polymerizable unsaturated bonds (hereinafter referred to also as "DV"), a monomer represented by the after-mentioned formula (6), ethylene and propylene may be mentioned. Further, a monomer having a halogen atom (hereinafter referred to also as "other monomer having a halogen atom") other than the above-mentioned monomers (for example, bromotrifluoroethylene or iodotrifluoroethylene), may be mentioned.

The DV units are units based on a monomer having two or more polymerizable unsaturated bonds.

As specific examples of the polymerizable unsaturated bond, a double bond (C=C) of carbon atom-carbon atom and a triple bond (C≡C) of carbon atom-carbon atom may be mentioned.

The number of polymerizable unsaturated bonds in DV is preferably from 2 to 6, more preferably 2 or 3, particularly preferably 2, in that the polymerization reactivity will be superior.

DV preferably further has a fluorine atom, in that the compression set at high temperature of a crosslinked rubber article will be further low.

DV is preferably a monomer represented by the formula (3), in that the compression set of a crosslinked rubber article at high temperature will be further low.

$$(CR^{31}R^{32}=CR^{33})_{a3}R^{34} \qquad (3)$$

In the formula (3), $R^{31}$, $R^{32}$ and $R^{33}$ each independently represent a hydrogen atom, a fluorine atom, a methyl group or a trifluoromethyl group, a3 represents an integer of from 2 to 6, and $R^{34}$ represents a $C_{1-10}$ a3 valent perfluorohydrocarbon group or a group having an etheric oxygen atom at a terminal or in a carbon-carbon bond of said perfluorohydrocarbon group. A plurality of $R^{31}$, a plurality of $R^{32}$ and a plurality of $R^{33}$ may be the same or different from one another, however, they are particularly preferably the same.

a3 is preferably 2 or 3, particularly preferably 2.

In that the polymerization reactivity of DV will be superior, it is preferred that $R^{31}$, $R^{32}$ and $R^{33}$ are fluorine atoms or hydrogen atoms, it is more preferred that all of $R^{31}$, $R^{32}$ and $R^{33}$ are fluorine atoms or all of them are hydrogen atoms, and from the point of the heat resistance and the chemical resistance of the crosslinked rubber article, it is particularly preferred that all of $R^{31}$, $R^{32}$ and $R^{33}$ are fluorine atoms.

$R^{34}$ may be linear, branched or cyclic, preferably linear or branched, particularly preferably linear. The number of carbon atoms in $R^{34}$ is preferably from 2 to 10, more preferably from 3 to 8, further preferably from 3 to 6, particularly preferably from 3 to 5.

$R^{34}$ may have an etheric oxygen atom or may have no etheric oxygen atom, however, $R^{34}$ preferably has an etheric oxygen atom, in that the crosslinking reactivity and the rubber properties will be superior.

The number of etheric oxygen atoms in $R^{34}$ is preferably from 1 to 6, more preferably from 1 to 3, particularly preferably 1 or 2. $R^{34}$ preferably has an etheric oxygen atom at a terminal of $R^{34}$.

Among the monomers represented by the formula (3), as specific examples of the preferred monomer, a monomer represented by the formula (4) and a monomer represented by the formula (5) may be mentioned.

$$(CF_2=CF)_2R^{41} \qquad (4)$$

In the formula (4), $R^{41}$ represents a $C_{2-10}$ bivalent perfluorohydrocarbon group or a group having an etheric oxygen atom at a terminal or in a carbon-carbon bond of said perfluorohydrocarbon group.

As specific examples of the monomer represented by the formula (4), $CF_2=CFO(CF_2)_2OCF=CF_2$, $CF_2=CFO(CF_2)_3OCF=CF_2$, $CF_2=CFO(CF_2)_4OCF=CF_2$, $CF_2=CFO(CF_2)_6OCF=CF_2$, $CF_2=CFO(CF_2)_8OCF=CF_2$, $CF_2=CFO(CF_2)_2OCF(CF_3)CF_2OCF=CF_2$, $CF_2=CFO(CF_2)_2O(CF(CF_3)CF_2O)_2CF=CF_2$, $CF_2=CFOCF_2O(CF_2CF_2O)_2CF=CF_2$, $CF_2=CFO(CF_2O)_3O(CF(CF_3)CF_2O)_2CF=CF_2$, $CF_2=CFOCF_2CF(CF_3)O(CF_2)_2OCF(CF_3)CF_2OCF=CF_2$ and $CF_2=CFOCF_2CF_2O(CF_2O)_2CF_2CF_2OCF=CF_2$ may be mentioned.

Among the monomers represented by the formula (4), as specific examples of a more preferred monomer, $CF_2=CFO(CF_2)_3OCF=CF_2$ and $CF_2=CFO(CF_2)_4OCF=CF_2$ may be mentioned.

$$(CH_2=CH)_2R^{51} \qquad (5)$$

In the formula (5), $R^{51}$ represents a $C_{2-10}$ bivalent perfluorohydrocarbon group or a group having an etheric oxygen atom at a terminal or in a carbon-carbon bond of said perfluorohydrocarbon group.

As specific examples of the monomer represented by the formula (5), $CH_2=CH(CF_2)_2CH=CH_2$, $CH_2=CH(CF_2)_4CH=CH_2$ and $CH_2=CH(CF_2)_6CH=CH_2$ may be mentioned.

Among the monomers represented by the formula (5), as a specific example of a more preferred monomer, $CH_2=CH(CF_2)_6CH=CH_2$ may be mentioned.

When DV is copolymerized, the polymerizable double bond at a terminal of DV reacts during the polymerization, whereby a copolymer (A) having a branched chain is obtained.

The formula (6) is as follows:

$$CF_2=CF-O-R^{f6} \qquad (6)$$

In the formula (6), $R^{f6}$ represents a $C_{1-8}$ perfluoroalkyl group having from 1 to 5 etheric oxygen atoms. The number of carbon atoms in $R^{f6}$ is preferably from 1 to 6, particularly preferably from 1 to 5.

As specific examples of the monomer represented by the formula (6), perfluoro(3,6-dioxa-1-heptene), perfluoro(3,6-dioxa-1-octene) and perfluoro(5-methyl-3,6-dioxa-1-nonene) may be mentioned.

The content of the RCN units is preferably from 0.05 to 5 mol %, more preferably from 0.1 to 3 mol %, particularly preferably from 0.2 to 1.5 mol % to all units in the copolymer (A), in that the effects of the present invention will be superior.

The content of TFE units is preferably from 60 to 80 mol %, more preferably from 63 to 75 mol %, particularly preferably from 66 to 72 mol %, to all units in the copolymer (A), in that the effects of the present invention will be superior.

In a case where the copolymer (A) contains PAVE units, the content of PAVE units is preferably from 20 to 40 mol %, more preferably from 24 to 36 mol %, particularly preferably from 27 to 33 mol %, to all units in the copolymer (A), in that the elongation of the crosslinked rubber article will be superior.

In a case where the fluorinated copolymer contains other monomer units, the content of other monomer units is preferably from 0.01 to 20 mol %, more preferably from 0.5 to 10 mol %, particularly preferably from 1 to 5 mol % to all units in the fluorinated copolymer, in that the rubber properties of the crosslinked rubber article will be excellent.

The copolymer (A) is preferably a perfluoropolymer, in that the effects of the present invention will be superior.

Here, "perfluoropolymer" is a polymer having a chain of carbon atoms as the main chain, having substantially no hydrogen atom bonded to the carbon atom and having fluorine atoms instead of hydrogen atoms. The perfluoropolymer may have a multivalent atom other than a carbon atom in its side chain, and such a multivalent atom is preferably an oxygen atom.

Here, "having substantially no hydrogen atom" means that the content of hydrogen atoms in the perfluoropolymer is 0.5 mass % or lower, preferably 0.1 mass % or lower, more preferably 0.07 mass % or lower, particularly preferably 0.05 mass % or lower. When the content of hydrogen atoms falls within the above range, good heat resistance and good chemical resistance can be easily obtained.

The copolymer (A) may have iodine atoms. In such a case, the copolymer (A) preferably has iodine atoms at a terminal of the polymer chain.

As iodine atoms, iodine atoms derived from an iodine compound which functions as the after-mentioned chain transfer agent and iodine atoms in units based on a monomer having an iodine atom among the above-mentioned other monomers having a halogen atom such as iodotrifluoroethylene may be mentioned, and iodine atoms derived from an iodine compound which functions as the chain transfer agent are preferred.

When the copolymer (A) has iodine atoms, the content of iodine atoms is preferably from 0.01 to 5.0 mass %, more preferably from 0.05 to 2.0 mass %, particularly preferably from 0.05 to 1.0 mass % to the total mass of the copolymer (A). When the content of iodine atoms falls within the above range, the crosslinking reactivity of the copolymer (A) is improved, whereby the mechanical properties of a crosslinked rubber article will be excellent.

The content of the copolymer (A) is preferably from 60 to 99 mass %, more preferably from 70 to 99 mass %, particularly preferably from 80 to 99 mass %, to the total mass of the present composition.

(Method for Producing Copolymer (A))

One example of the method for producing the copolymer (A) may be a method of copolymerizing the above-mentioned monomers in the presence of a radical polymerization initiator.

As the radical polymerization initiator, a water-soluble polymerization initiator or a redox polymerization initiator is preferred.

Specific examples of the water-soluble polymerization initiator may be persulfates such as ammonium persulfate, sodium persulfate and potassium persulfate, and organic polymerization initiators such as disuccinic acid peroxide and azobisisobutylamidine dihydrochloride, and among them, persulfates are preferred, and ammonium persulfate is more preferred.

As the redox polymerization initiator, a polymerization initiator having a persulfate and a reducing agent combined, may be mentioned. Among them, a polymerization initiator capable of polymerizing each monomer at a polymerization temperature in a range of from 0 to 85° C. is preferred. Specific examples of the persulfate to constitute the redox polymerization initiator may be alkali metal salts of persulfate such as ammonium persulfate, sodium persulfate and potassium persulfate, and ammonium persulfate is preferred. Specific examples of the reducing agent to be combined with the persulfate may be a thiosulfate, a sulfite, a hydrogen sulfite, a pyrosulfite and a hydroxymethanesulfinate, a hydroxymethanesulfinate is preferred, and sodium hydroxymethanesulfinate is particularly preferred.

In the method for producing the copolymer (A), the above-mentioned monomers may be copolymerized in the presence of a chain transfer agent with the radical polymerization initiator.

The chain transfer agent is preferably an iodine compound, particularly preferably an iodine compound represented by the formula $R^{12}$. In the above formula, R represents an alkylene group or perfluoroalkylene group having at least 3 (preferably from 3 to 8) carbon atoms.

Specific examples of the iodine compound represented by the formula $R^{12}$ may be 1,3-diiodopropane, 1,4-diiodobutane, 1,6-diiodohexane, 1,8-diiodooctane, 1,3-diiodoperfluoropropane, 1,4-diiodoperfluorobutane, 1,6-diiodoperfluorohexane and 1,8-diiodoperfluorooctane.

As the iodine compound, an iodine compound having a perfluoroalkylene group is preferred, and 1,4-diiodoperfluorobutane is particularly preferred.

When the above monomers are copolymerized in the presence of such an iodine compound, iodine atoms can be introduced into the copolymer (A).

With respect to details of the components other than the above to be used in the production of the copolymer (A) and the production method, reference may be made to the method described in paragraphs [0019] to [0034] of WO2010/082633.

<Copolymer (B)>

The copolymer (B) has units having at least one functional group (hereinafter referred to also as "specific functional group") selected from the group consisting of a group having a carbonyl group, a hydroxy group, an epoxy group and an isocyanate group and TFE units.

The present composition contains the copolymer (B), whereby the effects of the present invention can be obtained, and the crosslinked rubber article has improved exposure resistance against plasma using a fluorine gas.

The copolymer (B) preferably has units having a specific functional group, TFE units and PAVE units, in that the effects of the present invention will be superior.

Among the specific functional groups, the group having a carbonyl group is not particularly limited, so long as it is a group having a carbonyl group in its structure, and a group having a carbonyl group between carbon atoms of a hydrocarbon group, a carbonate group, a carboxy group, a haloformyl group, an alkoxycarbonyl group, an acid anhydride residue, a polyfluoroalkoxycarbonyl group and an ester group may, for example, be mentioned.

Among them, the group having a carbonyl group is preferably at least one member selected from the group consisting of a group having a carbonyl group in carbon atoms of a hydrocarbon group, a carbonate group, a carboxy group, a haloformyl group, an alkoxycarbonyl group and an acid anhydride residue, particularly preferably either one or both of a carboxy group and an acid anhydride residue, from the point of the reactivity with the nitrile group in the copolymer (A).

The hydrocarbon group in the group having a carbonyl group between carbon atoms of a hydrocarbon group is preferably a $C_{2-8}$ linear or branched alkylene group. Here, the number of carbon atoms in the carbonyl group is not included in the number of carbon atoms in the alkylene group.

The haloformyl group is represented by $-C(=O)-X$ (wherein X is a halogen atom). As specific examples of the halogen atom in the haloformyl group, a fluorine atom and a chlorine atom may be mentioned, and a fluorine atom is preferred. That is, the haloformyl group is preferably a fluoroformyl group (also referred to as "carbonyl fluoride group").

The alkoxy group in the alkoxycarbonyl group may be linear or branched and is preferably a $C_{1-8}$ alkoxy group, particularly preferably a methoxy group or an ethoxy group.

The units having a specific functional group are preferably units based on a monomer having a specific functional group (hereinafter referred to also as "$R_X$").

$R_X$ may have plural specific functional groups. In a case where $R_X$ has plural specific functional groups, the type of such plural specific functional groups may be the same or different from one another.

$R_X$, which is used as a monomer, has a polymerizable unsaturated bond. Specific examples of the polymerizable unsaturated bond are as mentioned above.

$R_X$ is preferably a compound having one specific functional group and one polymerizable unsaturated bond.

Among $R_X$, as specific examples of a monomer having a group having a carbonyl group, a monomer having an acid anhydride residue (hereinafter referred to also as "$R_{X1}$"), a monomer having a carboxy group (hereinafter referred to also as "$R_{X2}$"), a vinyl ester, a (meth)acrylate and $CF_2$=$CFOR^{fX}CO_2X^1$ (wherein $R^{fX}$ is a $C_{1-10}$ perfluoroalkylene group which may have an etheric oxygen atom, and $X^1$ is a $C_{1-3}$ alkyl group) may be mentioned.

As specific examples of $R_{X1}$, itaconic anhydride (hereinafter referred to also as "IAH"), citraconic anhydride (hereinafter referred to also as "CAH"), 5-norbornene-2,3-dicarboxylic anhydride (another name: himic anhydride, hereinafter referred to also as "NAH") and an unsaturated dicarboxylic anhydride such as maleic anhydride may be mentioned.

As specific examples of $R_{X2}$, an unsaturated dicarboxylic acid such as itaconic acid, citraconic acid, 5-norbornene-2, 3-dicarboxylic acid and maleic acid, an unsaturated monocarboxylic acid such as an acrylic acid and a methacrylic acid, and $CF_2$=$CFOR^{fX}CO_2H$ (wherein $R^{fX}$ is a $C_{1-10}$ perfluoroalkylene group which may have an etheric oxygen atom) may be mentioned.

As specific examples of the vinyl ester, vinyl acetate, vinyl chloroacetate, vinyl butyrate, vinyl pivalate, vinyl benzoate and vinyl crotonate may be mentioned.

As specific examples of the (meth)acrylate, a (polyfluoroalkyl)acrylate and a (polyfluoroalkyl)methacrylate may be mentioned.

Among $R_X$, as specific examples of a monomer having a hydroxy group, a vinyl ester, a vinyl ether, an allyl ether, a (meth)acrylate compound and a crotonic acid modified compound such as hydroxyethyl crotonate, having one or more hydroxy groups at a terminal or a side chain, and an allyl alcohol may be mentioned.

Among $R_X$, as specific examples of a monomer having an epoxy group, an unsaturated glycidyl ether such as allyl glycidyl ether, 2-methylallyl glycidyl ether and vinyl glycidyl ether and an unsaturated glycidyl ester such as glycidyl acrylate and glycidyl methacrylate may be mentioned.

Among $R_X$, as specific examples of a monomer having an isocyanate group, an unsaturated monomer having an isocyanate group such as 2-(meth)acryloyloxyethyl isocyanate, 2-(2-(meth)acryloyloxyethoxy)ethyl isocyanate and 1,1-bis ((meth)acryloyloxymethyl)ethyl isocyanate may be mentioned.

$R_X$ is preferably a monomer having a group having a carbonyl group and preferably one containing $R_{X1}$, from the point of the reactivity with the nitrile group in the copolymer (A). Among them, one containing at least one member selected from the group consisting of IAH, CAH and NAH is preferred, and one containing NAH is particularly preferred, in that the production of the copolymer (B) will be easy.

As the $R_X$, one type may be used alone, or two or more types may be used in combination.

In a case where the copolymer (B) has PAVE units, specific examples of PAVE and a preferred embodiment are the same as PAVE in the copolymer (A).

The copolymer (B) may have units based on a monomer other than the above-mentioned monomers (hereinafter referred to also as "other monomer"). Specific examples and a preferred embodiment of such other monomer are the same as other monomer in the copolymer (A).

The copolymer (B) may have a specific functional group as the main chain terminal group. The specific functional group as the main chain terminal group is preferably an alkoxycarbonyl group, a carbonate group, a carboxy group, a fluoroformyl group, an acid anhydride residue or a hydroxy group. Such a functional group can be introduced by appropriately selecting a radical polymerization initiator, a chain transfer agent, etc. to be used at the time of producing the copolymer (B).

The copolymer (B) preferably has units having a specific functional group, TFE units and PAVE units.

In such a case, the content of the units having a specific functional group is preferably from 0.01 to 3 mol %, more preferably from 0.03 to 2 mol %, particularly preferably from 0.05 to 1 mol %, to all units in the copolymer (B), in that the effects of the present invention will be superior.

Further, the content of TFE units is preferably from 90 to 99.89 mol %, more preferably from 95 to 99.47 mol %, particularly preferably from 96 to 98.95 mol %, to all units in the copolymer (B), in that the effects of the present invention will be superior.

Further, the content of PAVE units is preferably from 0.1 to 9.99 mol %, more preferably from 0.5 to 4.97 mol %, particularly preferably from 1 to 3.95 mol %, to all units in the copolymer (B), in that the effects of the present invention will be superior.

The copolymer (B) may be a fluorinated copolymer having units having a specific functional group, TFE units and HFP units.

In such a case, the content of the units having a specific functional group is preferably from 0.01 to 3 mol %, more preferably from 0.03 to 2 mol %, particularly preferably from 0.05 to 1 mol %, to all units in the copolymer (B).

Further, the content of TFE units is preferably from 90 to 99.89 mol %, more preferably from 91 to 98 mol %, particularly preferably from 92 to 97 mol %, to all units in the copolymer (B), in that the effects of the present invention will be superior.

Further, the content of HFP units is preferably from 0.1 to 9.99 mol %, more preferably from 1 to 9.0 mol %, particularly preferably from 2 to 8 mol %, to all units in the copolymer (B), in that the effects of the present invention will be superior.

The content of the copolymer (B) is 50 parts by mass or lower, more preferably 30 parts by mass or lower, further preferably 20 parts by mass or lower, particularly preferably 15 parts by mass or lower, to 100 parts by mass of the copolymer (A), in that a crosslinked rubber article having a lower compression set at high temperature will be obtained.

The content of the copolymer (B) is preferably 2 parts by mass or higher, more preferably 5 parts by mass or higher, particularly preferably 7 parts by mass or higher, to 100 parts by mass of the copolymer (A), in that the break of a crosslinked rubber article after compression will be further suppressed.

The melting point of the copolymer (B) is preferably from 260 to 320° C., more preferably from 280° C. to 315° C., further preferably from 295 to 310° C. When the melting point of the copolymer (B) is the lower limit value or higher in the above range, the crosslinked rubber article made of the present composition containing the copolymer (B) is excellent in the heat resistance, and when the melting point is the upper limit value or lower in the above range, the processability is excellent, and the crosslinked rubber article made of the present composition containing the copolymer (B) is excellent in the surface smoothness.

The melting point of the copolymer (B) can be controlled by the type and the proportion of the units constituting the copolymer (B), the molecular weight, etc. For example, as the proportion of the TFE units increases, the melting point of the copolymer (B) tends to be high.

The melt flow rate (referred to also as "MFR") of the copolymer (B) is preferably from 1 to 1,000 g/10 min, more preferably from 5 to 20 g/10 min. Here, the above-mentioned MFR is a value measured at a temperature (usually 372° C.) higher by 20° C. than the melting point of the copolymer (B).

When the MFR is the lower limit value or higher in the above range, the copolymer (B) is excellent in the processability, and the crosslinked rubber article made of the present composition containing the copolymer (B) is excellent in the surface smoothness.

When MFR is the upper limit value or lower in the above range, the copolymer (B) is excellent in the mechanical strength, and the crosslinked rubber article made of the present composition containing the copolymer (B) is excellent in the mechanical strength.

MFR is an index of the molecular weight of the copolymer (B), and the higher the MFR is, the smaller the molecular weight is, and the smaller the MFR is, the larger the molecular weight is. The molecular weight of the copolymer (B), that is MFR is controlled by the production condition of the copolymer (B). For example, if the polymerization time at the time of polymerizing monomers is shortened, MFR tends to be high.

(Method for Producing Copolymer (B)) One example of the method for producing the copolymer (B) may be a method of copolymerizing the above-mentioned monomers in the presence of a radical polymerization initiator, and the detail is as described in WO2016/017801.

(Form)

The copolymer (B) is preferably contained in the form of particles in the present composition. That is, the copolymer (B) is preferably contained in the form of resin particles containing the copolymer (B).

The resin particles may contain a resin (hereinafter referred to also as "other resin") other than the copolymer (A) and the copolymer (B). As such other resin, the after-mentioned fluorinated copolymer (for example, a tetrafluoroethylene/fluoroalkyl vinyl ether copolymer, a tetrafluoroethylene/hexafluoropropylene copolymer, an ethylene/tetrafluoroethylene copolymer, etc.) other than the copolymer (A) and the copolymer (B), a polytetrafluoroethylene, an aromatic polyester, a polyamideimide and a thermoplastic polyimide may be mentioned.

The content of the copolymer (B) in the resin particles is preferably from 80 to 100 mass %, more preferably from 85 to 100 mass %, further preferably from 90 to 100 mass %, particularly preferably 100 mass %, to the total mass of the resin particles.

The average particle size of the resin particles is preferably from 0.02 to 50 μm, more preferably from 0.02 to 35 μm, particularly preferably from 0.02 to 10 μm, in that the effects of the present invention will be superior.

The average particle size of the resin particles is a volume-based cumulative 50% particle size (D50) obtained by a laser diffraction/scattering method. That is, the particle size distribution is measured by a laser diffraction/scattering method, a cumulative curve is obtained as the total volume of the group of the particles being 100%, and the average particle size of the resin particles is the particle size at a point that the cumulative volume is 50% on the cumulative curve.

The resin particles may, for example, be produced by the method for producing resin particles and a resin powder disclosed in WO2016/017801.

<Crosslinking Agent>

As specific examples of the crosslinking agent, an organic peroxide and a compound having two or more amino groups (hereinafter referred to also as "polyamine compound") may be mentioned, and a polyamine compound is preferred, in that the crosslinkability of the copolymer (A) is excellent, and a crosslinked rubber article having a low compression set at high temperature will be obtained.

The polyamine compound may be a compound of an aliphatic hydrocarbon of which hydrogen atoms are substituted by amino groups or a compound of an aromatic hydrocarbon of which hydrogen atoms are substituted by amino groups, and a compound of an aromatic hydrocarbon of which hydrogen atoms are substituted by amino groups is preferred, in that the effects of the present invention will be superior.

The polyamine compound preferably has a fluorine atom. In such a case, the compatibility with the copolymer (A) will be good, whereby a crosslinked rubber article having a low compression set at high temperature will be obtained.

As specific examples of the polyamine compound, hexamethylenediamine, hexamethylenediamine carbamate, 2,2-bis[4-(4-aminophenoxy)phenyl]propane, 2,2-bis(3-amino-4-hydroxyphenyl)propane, 2,2-bis(3-amino-4-hydroxyphenyl)hexafluoropropane (hereinafter referred to also as "BOAP", another name: bisaminophenol AF), 2,2-bis(3,4-diaminophenyl)propane, 2,2-bis(3,4-diaminophenyl)hexafluoropropane, 2,2-bis(3-amino-4-(N-phenylamino)phenyl)hexafluoropropane, 4,4'-methylenedianiline, m-phenylenediamine, adipic acid dihydrozide and the compound represented by the formula (XII) in Japanese Patent No. 5,833,657 may be mentioned. Among them, BOAP is preferred, in that the effects of the present invention will be superior.

The content of the crosslinking agent is preferably from 0.3 to 10 parts by mass, more preferably from 0.3 to 5 parts by mass, particularly preferably from 0.5 to 3 parts by mass, to 100 parts by mass of the copolymer (A). When the content of the crosslinking agent falls within the above range, the effects of the present invention will be superior.

<Specific Phosphorus Compound>

The present composition preferably contains a phosphorus compound having a melting point of 60° C. or lower (hereinafter referred to also as "specific phosphorus compound"), in that the effects of the present invention will be superior.

The melting point of the specific phosphorus compound is 60° C. or lower, and in that the dispersibility of the specific phosphorus compound is further improved, and the effects of the present invention will be superior, preferably 35° C. or lower, particularly preferably 20° C. or lower.

Here, a compound which is liquid at 20° C. is also included in the above mentioned compound having a melting point of the specific temperature or lower.

The boiling point of the specific phosphorus compound is preferably 50° C. or higher, more preferably 100° C. or higher, from the point of the handling efficiency.

The specific phosphorus compound is preferably a phosphine having an alkyl group or a phosphine oxide having an alkyl group, in that the dispersibility of the specific phosphorus compound is further improved, and the compression set of a crosslinked rubber article at high temperature will be further low, more preferably a trialkylphosphine or a trialkylphosphine oxide, further preferably the compound represented by the following formula (7) or the following formula (8), particularly preferably the compound represented by the following formula (7).

$$P(R^{71})_3 \qquad \text{formula (7)}$$

In the formula (7), $R^{71}$ represents a $C_{2-9}$ linear or branched alkyl group. Three $R^{71}$ may be the same or different from one another, however, they are preferably the same, in that the compression set of a crosslinked rubber article at high temperature will be further low.

$$PO(R^{81})_3 \qquad \text{formula (8)}$$

In the formula (8), $R^{81}$ represents a $C_{2-9}$ linear or branched alkyl group. Three $R^{81}$ may be the same or different from one another, however, they are preferably the same, in that the compression set of the crosslinked rubber article at high temperature will be further low.

The number of carbon atoms in $R^{71}$ is from 2 to 9 and preferably from 4 to 9, particularly preferably from 6 to 8, in that the compression set of a crosslinked rubber article at high temperature will be further low.

Three $R^{71}$ are each independently preferably a $C_{2-9}$ linear alkyl group, in that the compression set of a crosslinked rubber article at high temperature will be further low.

The number of carbon atoms in $R^{81}$ is from 2 to 9 and preferably from 4 to 9, particularly preferably from 6 to 8, in that the compression set of a crosslinked rubber article at high temperature will be further low.

Three $R^{81}$ are each independently preferably a $C_{2-9}$ linear alkyl group, in that the compression set of a crosslinked rubber article at high temperature will be further low.

Specific examples of the compound represented by the formula (7) may be triethylphosphine (melting point of –86° C., liquid at 20° C., boiling point of from 127 to 128° C.), tri-n-propylphosphine (melting point is unknown, liquid at 20° C., boiling point of from 72 to 74° C./12 mmHg), tri-n-butylphosphine (melting point of –65° C., liquid at 20° C., boiling point of 150° C./50 mmHg), tri-tert-butylphosphine (melting point of from 30 to 35° C., liquid or solid at 20° C., boiling point of 102° C./13 mmHg), tri-n-pentylphosphine (melting point is unknown, liquid at 20° C., boiling point is unknown), tri-n-hexylphosphine (melting point is unknown, liquid at 20° C. boiling point of 227° C./50 mmHg) and tri-n-octylphosphine (melting point is unknown, liquid at 20° C., boiling point of 175° C./0.3 mmHg).

Specific examples of the compound represented by the formula (8) may be triethylphosphine oxide (melting point of 52° C., solid at 20° C.), tri-n-propylphosphine oxide (melting point of 39° C., solid at 20° C.), tri-n-hexylphosphine oxide (melting point of 34° C., solid at 20° C.) and tri-n-octylphosphine oxide (melting point of 52° C., solid at 20° C.).

Among the specific phosphorus compounds, tri-n-octylphosphine is preferred, in that the compression set of a crosslinked rubber article at high temperature will be further low.

The content of the specific phosphorus compound is preferably 0.01 part by mass or higher, more preferably from 0.10 part by mass or higher, to 100 parts by mass of the copolymer (A), in that the break of a crosslinked rubber article can be further suppressed, and is preferably 0.20 part by mass or higher, particularly preferably 0.30 part by mass or higher, in that the mold release property of a crosslinked rubber article will be excellent.

The content of the specific phosphorus compound is preferably 5 parts by mass or lower, more preferably 2 parts by mass or lower, particularly preferably 1.0 parts by mass or lower, to 100 parts by mass of the copolymer (A), in that the compression set of a crosslinked rubber article at high temperature can be further low.

<Other Components>

The present composition may contain components other than those mentioned above to such an extent that the effects of the present invention are not impaired.

Such other components may be acid acceptors (e.g. fatty acid esters, fatty acid metal salts, bivalent metal oxides (e.g. magnesium oxide, calcium oxide, zinc oxide, lead oxide, etc.)), fillers and reinforcing agents (e.g. carbon black, barium sulfate, calcium metasilicate, calcium carbonate, titanium oxide, silicon dioxide, fluorinated copolymers other than the copolymer (A) and the copolymer (B) (e.g. a tetrafluoroethylene/fluoro(alkyl vinyl ether) copolymer, a tetrafluoroethylene/hexafluoropropylene copolymer, an ethylene/tetrafluoroethylene copolymer, etc.), a polytetrafluoroethylene (PTFE), an aromatic polyester, a polyamideimide and a thermoplastic polyimide, clay and talc), scorch retardants (e.g. phenolic hydroxy group-containing compounds such as bisphenol A, quinones such as hydroquinone, α-methylstyrene dimers such as 2,4-di(3-isopropylphenyl)-4-methyl-1-pentene, etc.), crown ethers (e.g. 18-crown-6, etc.) and lubricants (e.g. sodium stearate, etc.).

In a case where the present composition contains other components, the total content of other components is preferably higher than 0.1 parts by mass and 30 parts by mass or lower, more preferably from 1 to 15 parts by mass, particularly preferably from 3 to 5 parts by mass, to 100 parts by mass of the copolymer (A).

As the method for preparing the present composition, a method of mixing the above-mentioned respective components may be mentioned. The mixing of the respective components may be carried out by using a mixing device for rubber, such as a roll, a kneader, a Banbury mixer or an extruder.

Further, after the above respective components are mixed to obtain a mixture, the mixture may be formed. Specific examples of the method of forming the mixture may be compression molding, injection molding, extrusion, calendering, and a method of dissolving the mixture in a solvent and applying the solution to e.g. a substrate by dipping or coating.

[Crosslinked Rubber Article]

The crosslinked rubber article of the present invention is a rubber article which is obtainable by crosslinking the copolymer (A) in the above mentioned present composition.

As the method for crosslinking the copolymer (A) in the present composition, a method of crosslinking the copolymer by heating the present composition is preferred.

As specific examples of the crosslinking method by heating, heat press crosslinking, steam crosslinking and hot air crosslinking may be mentioned, from such methods, a suitable method may be properly selected in consideration of the form and application of the present composition.

The heating conditions are preferably at from 100 to 400° C. for from 1 second to 24 hours.

The crosslinked rubber obtained by heating (primary crosslinking) the present composition may be further heated for secondary crosslinking. By conducting the secondary crosslinking, it is possible to stabilize or improve the mechanical properties, compression set and other properties of the crosslinked rubber.

Heating conditions at the time of conducting the secondary crosslinking are preferably from 80 to 350° C. for from 30 minutes to 48 hours.

A crosslinking method other than crosslinking the copolymer (A) by heating, may be a method of crosslinking the copolymer (A) by irradiating the present composition with radiation. Specific examples of the radiation to be applied may be electron beams and ultraviolet rays.

<Physical Properties>

The compression set of the crosslinked rubber article at 300° C. for 70 hours is preferably 70% or lower, and it is more preferably 50% or lower, particularly preferably 40% or lower, further preferably 30% or lower, in that the copolymer (A) is crosslinked well, and the shape recovery of the crosslinked rubber article after pressurization will be superior.

The compression set of the crosslinked rubber article at 300° C. for 70 hours is measured by the method described in the after described Examples.

The tensile strength (tensile break strength) of the crosslinked rubber article is preferably from 10 to 50 MPa, particularly preferably from 15 to 40 MPa, in that rubber properties are excellent.

The tensile elongation (degree of elongation at break) of the crosslinked rubber article is preferably from 100 to 500%, particularly preferably from 150 to 400%, in that the rubber properties are excellent.

The tensile strength and the tensile elongation of the crosslinked rubber article are values measured by methods in accordance with JIS K6251: 2010 (ISO37: 2005).

The hardness (Shore-A) of the crosslinked rubber article is preferably from 55 to 90, more preferably from 60 to 85, particularly preferably from 70 to 80, in that the rubber properties are excellent.

The hardness (Shore-A) of the crosslinked rubber article is a value measured with respect to a molded product having a plate shape (thickness of 1 mm) of the crosslinked rubber article by using a type A durometer in accordance with JIS K6253-1: 2012.

<Applications>

The crosslinked rubber article is suitable as a material for e.g. O-rings, sheets, gaskets, oil seals, diaphragms and V-rings. Further, it is also useful for applications, such as heat-resistant chemical-resistant sealing materials, heat-resistant oil-resistant sealing materials, electric wire coating materials, sealing materials for semiconductor manufacturing equipment, sealing materials for liquid crystal display panel manufacturing equipment, sealing materials for LED manufacturing equipment, corrosion-resistant rubber paints, sealing materials for urea-resistant grease, etc., rubber paints, adhesive rubber, hoses, tubes, calendered sheets (rolls), sponges, rubber rolls, members for oil drilling, heat dissipating sheets, solution crosslinkers, rubber sponges, bearing seals (urea resistant grease, etc.), lining (chemical resistant), automotive insulating sheets, insulating sheets for electronic equipment, rubber bands for watches, packings for endoscope (amine resistant), bellows hoses (processed from calendered sheets), packings/valves for water heaters, fenders (marine civil engineering, ships), fibers and non-woven fabrics (protective clothing, etc.), sealing materials for substrate, rubber gloves, stators for uniaxial eccentric screw pumps, parts for urea SCR systems, vibration isolators, damping agents, sealants, additives to other materials, and toys.

EXAMPLES

Hereinafter, the present invention will be described in detail with reference to Examples. Ex. 1 to Ex. 5 and Ex. 8 to Ex. 10 are Examples of the present invention, and Ex. 6 and Ex. 7 are Comparative Examples. However, the present invention is not limited to these Examples. The blend amounts of the respective components in Table given later are based on mass.

[Measurement of Composition of Fluorinated Copolymer]

The contents (mol %) of the respective units in the after-mentioned copolymer (A-1) and copolymer (H-1) were calculated by the $^{19}$F-nuclear magnetic resonance (NMR) analysis. Here, the content of propylene units was calculated by $^{1}$H and $^{13}$C-nuclear magnetic resonance (NMR) analysis.

The contents (mol %) of the respective units in the after-mentioned copolymer (B-1) and copolymer (H-2) were calculated by the molten NMR analysis and the content analysis of the fluorine. Here, the content of NAH units was calculated by the following infrared absorption spectrum analysis.

(Infrared Absorption Spectrum Analysis)

A 200 μm film was obtained by pressing the after-mentioned copolymer (B-1). In the infrared absorption spectrum, the absorption peak of the units based on NAH in the copolymer (B-1) was measured at 1,778 cm$^{-1}$ in all cases. The absorbance of the absorption peak was measured, and the proportion of the units based on NAH in the copolymer (B-1) was obtained by using the molar absorption coefficient of NAH of 20,810 mol$^{-1}$·l·cm$^{-1}$.

[Hardness]

The hardness (Shore-A) of a test specimen of the crosslinked rubber article was measured by using a type A durometer in accordance with JIS K6253-3: 2012.

Here, as the measuring apparatus, an automatic hardness meter for rubbers (Digitest Shore-A, manufactured by H-Bareiss) was used.

Further, the test was carried out by using three test specimens, and an arithmetic mean of measured values of the three test specimens was recorded.

[Tensile Strength and Tensile Elongation]

The tensile strength and the tensile elongation were measured by using test specimens having a plate-shaped crosslinked rubber article (thickness of 1 mm) punched out by a No. 4 dumbbell in accordance with JIS K6251: 2010 (ISO37: 2005).

Here, as the measuring apparatus, a tensile tester having a data processer (Quick reader TS-2530, manufactured by UESHIMA SEISAKUSHO CO., LTD.) was used.

Further, each test was carried out by using three test specimens, and an arithmetic mean of measured values of the three test specimens was recorded.

[Compression Set at High Temperature]

The compression set (%) when a test specimen of the crosslinked rubber article was stored at 300° C. for 70 hours, was measured in accordance with JIS K 6262:2013. Here, as the test specimen, an O-ring test specimen of P26 in accordance with JIS B 2401-1: 2012 was used. The test was carried out by using two test specimens, and an arithmetic mean of measured values of the two test specimens was used.

The compression set was calculated by the following formula. Here, the specimen is superior as the compression set is closer to 0%.

$$\text{Compression set (\%)} = (\text{thickness of original test specimen} - \text{thickness of test specimen 30 minutes after removed from compression apparatus}) \div (\text{thickness of original specimen} - \text{thickness of spacer}) \times 100$$

[Break after Compression]

Regarding the two test specimens after the above-described test of "compression set at high temperature", the occurrence of break was visually observed.

Regarding the two test specimens in each example, the results are shown in the after-mentioned Table 1, as a case where no break was observed on two specimens, is represented by "non", a case where the break was observed on one specimen is represented by "½ break", and a case where the break was observed on two specimens is represented by "2/2 break".

[Roll Stickiness]

The components in blending amounts as identified in Table 1 were kneaded by a two-roll mill for 10 minutes at room temperature, and stickiness to the roll when removing the mixed fluorinated copolymer composition from the roll at the last stage was evaluated.

<Evaluation Standard>

○: Stickiness of the fluorinated copolymer composition to the roll was not observed.

Δ: Stickiness of the fluorinated copolymer composition to the roll and stain on the roll surface were observed.

x: Stickiness of the fluorinated copolymer composition to the roll and stain on the roll surface were clearly observed.

[Mold Release Test]

A fluorinated copolymer composition was added in a sheet shape mold, the fluorinated copolymer composition was crosslinked at 180° C. for 20 minutes to obtain a crosslinked rubber article (length of 100 mm×width of 60 mm×thickness of 1 mm) attached to the mold. Immediately after the completion of the crosslinking reaction, air was sprayed on an interface between the crosslinked rubber article and the mold by using an air gun (product name: Cyclone duster, manufactured by Chuo Kuki Co., Ltd.), and the mold releasing property was evaluated by the following evaluation standard.

Here, the temperature of the crosslinked rubber article at the time of air spray was considered to be about 180° C., since air was sprayed immediately after the completion of the crosslinking reaction.

<Spray Condition of Air by Air Gun>

Pressure: 0.5 MPa

Time of spraying air: 3 seconds

<Evaluation Standard>

○: The crosslinked rubber article was released from the mold.

Δ: A part of the crosslinked rubber article was not released from the mold.

x: The majority of the crosslinked rubber article was not released from the mold.

[Production of Fluorinated Copolymer (A-1)]

A stainless steel pressure resistant reactor equipped with anchor blades and having an internal volume of 20 L, was deaerated, then 7.2 L of ultrapure water, 880 g of a 30 mass % solution of $C_2F_5OCF_2CF_2OCF_2COONH_4$ as the emulsifier, 7.3 g of 8CNVE and 15.9 g of a 5 mass % aqueous solution of disodium hydrogen phosphate 12 hydrate, were charged, and the gas phase was replaced with nitrogen. While stirring at a rate of 375 rpm by using the anchor blades, 137 g of TFE and 635 g of PMVE were injected into the reactor, and then the internal temperature was raised to 80° C. The inner pressure of the reactor was 0.90 MPa (gauge). 28 mL of a 3 mass % aqueous solution of ammonium persulfate (APS) was added to initiate polymerization. When the ratio of added monomers injected before the initiation of polymerization (hereinafter referred to as initial monomers) is, as represented by a molar ratio, TFE:PMVE: 8CNVE=26.3:73.3:0.4.

After the initiation of the polymerization, along with the progress of the polymerization, monomers were injected as follows. Hereinafter, addition of monomers by injection after the initiation of polymerization is referred to as "post addition", and monomers injected after the initiation of polymerization are referred to as "post addition monomers".

At the time when the inner pressure of the reactor decreased to 0.89 MPa (gauge), TFE was injected to raise the inner pressure of the reactor to 0.90 MPa (gauge). This operation was repeated, and every time when 119.3 g of TFE was injected, 3.7 g of 8CNVE, 74 g of PMVE and 3.7 g of 8CNVE were injected in this order.

When the polymerization rate began to decrease, a 3 mass % aqueous solution of APS was appropriately added. The total amount of the 3 mass % aqueous solution of APS added after the initiation of the polymerization was 35 mL.

At the time when the cycle in which the total mass of TFE added reached 1,073.7 g finished, 119.3 g of TFE was injected. At the time when the total mass of post addition TFE reached 1,193 g, the addition of the post addition monomers was terminated, and the inner temperature of the reactor was cooled to 10° C. to terminate the polymerization reaction thereby to obtain a latex containing a fluorinated copolymer. The polymerization time was 375 minutes. Further, the total mass of the post addition monomers added was such that TFE was 1,193 g, PMVE was 666 g, 8CNVE was 66.6 g, and as calculated as molar ratio, TFE:PMVE: 8CNVE=74.0:25.0:1.0.

The latex was added to a 5 mass % aqueous solution of potassium aluminum sulfate to precipitate the fluorinated copolymer, and the fluorinated copolymer was separated. The fluorinated copolymer was filtrated, washed with ultrapure water and vacuum-dried at 50° C. to obtain a white fluorinated copolymer (hereinafter referred to as "copolymer (A1)"). The molar ratio of the respective units in the obtained fluorinated copolymer (A-1) was TFE units:PMVE units:8CNVE units=69.1:30.3:0.6.

[Copolymer (H-1)]

The "fluorinated rubber-1" in the section of Examples of JP-A-H06-306236 was used as a copolymer (H-1). The molar ratio of the respective units in the copolymer (H-1) was VdF units:TFE units:propylene units=35:40:25.

[Copolymer (B-1)]

The "fluorinated copolymer (X1-1)" in the section of Examples of WO2016/017801 was used as a copolymer (B-1). The molar ratio of the respective units in the copolymer (B-1) was NAH units:TFE units:PPVE units=0.1: 97.9:2.0.

The copolymer (B-1) is resin particles having an average particle size (D50) of from 2 to 3 μm.

[Copolymer (H-2)]

MP-102 (trade name) manufactured by Chemours was used as a copolymer (H-2). The molar ratio of the respective units in the copolymer (H-2) was TFE units:PPVE units=98.7:1.3.

Perkadox 14: trade name, manufactured by Kayaku Akzo Corporation, α,α'-bis(tert-butylperoxy)-p-diisopropylbenzene, organic peroxide (crosslinking agent)

TOCP: manufactured by Hokko Chemical Industry Co., Ltd., tri-n-octylphosphine (liquid at 20° C.), specific phosphorus compound

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Copolymer | (A-1) | 100 | 100 | 100 | 100 | 100 | 100 | 0 | 100 | 100 | 100 |
| | (H-1) | 0 | 0 | 0 | 0 | 0 | 0 | 100 | 0 | 0 | 0 |
| | (B-1) | 10 | 10 | 10 | 10 | 30 | 0 | 0 | 20 | 20 | 20 |
| | (H-2) | 0 | 0 | 0 | 0 | 0 | 10 | 0 | 0 | 0 | 0 |
| Crosslinking agent | BOAP | 1.5 | 1 | 0.5 | 0.5 | 1 | 1.5 | 0 | 1 | 1 | 1 |
| | Perhexa 25B | 0 | 0 | 0 | 0 | 0 | 0 | 1 | 0 | 0 | 0 |
| | Perkadox 14 | 0 | 0 | 0 | 0 | 0 | 0 | 1 | 0 | 0 | 0 |
| Specific phosphorus compound | TOCP | 0.3 | 0.3 | 0.3 | 0.1 | 0.3 | 0.3 | 0.5 | 0.3 | 0 | 0 |
| | TOCPO | 0 | 0 | 0 | 0 | 0 | 0 | 0 | 0 | 0.3 | 0 |
| Hardness | Shore A | 72.5 | 73.8 | 72.2 | 72.8 | 79.9 | 72.5 | 59.7 | 77.5 | 77.8 | 77.7 |
| Tensile strength | MPa | 24.5 | 24.3 | 26.4 | 19.4 | 25 | 24.5 | 12.5 | 19.1 | 21.8 | 21.2 |
| Tensile elongation | % | 210 | 227 | 250 | 248 | 236 | 210 | 460 | 189 | 196 | 184 |
| Compression set at high temperature | % | 20 | 25 | 28 | 27 | 36 | 20 | >100 | 33 | 34 | 37 |
| Break after compression | — | Non | Non | Non | Non | Non | 2/2 break | 2/2 break | Non | Non | Non |
| Roll stickiness | — | ○ | ○ | ○ | ○ | ○ | Δ | Δ | ○ | ○ | ○ |
| Mold release property | — | ○ | ○ | ○ | Δ | ○ | Δ | Δ | ○ | ○ | Δ |

The copolymer (H-2) is resin particles having an average particle size (D50) of from 10 to 20 μm.

[Ex. 1 to 10]

The components in blending amounts as identified in Table 1 were kneaded by a two-roll mill for 10 minutes at room temperature to obtain mixed fluorinated copolymer compositions.

The obtained fluorinated copolymer compositions were heat-pressed under the conditions shown below to obtain crosslinked rubber sheets having a thickness of 1 mm (primary crosslinking). The primary crosslinking in each of Ex.1 to Ex.6 and Ex. 8 to Ex.10 was carried out by hot press at 180° C. for 20 minutes. The primary crosslinking in Ex.7 was carried out by hot press at 170° C. for 10 minutes.

Then, the crosslinked rubber sheets were heated in an oven in a nitrogen atmosphere under conditions shown below (secondary crosslinking). The secondary crosslinking in each of Ex.1 to Ex.6 and Ex. 8 to Ex.10 was carried out by heating at 90° C. for 3 hours, then raising the temperature to 305° C. over 5 hours and heating at 305° C. for 13 hours. The secondary crosslinking in Ex.7 was carried out by heating at 230° C. for 13 hours.

Then, the crosslinked rubber sheets were cooled to room temperature to obtain crosslinked rubber sheets of Ex. 1 to 10.

Using the obtained crosslinked rubber sheets, the above-mentioned physical properties were measured. The measurement results are shown in Table 1.

A summary of the respective components listed in Table 1, except for the fluorinated copolymers, is given below.

BOAP: 2,2-bis(3-amino-4-hydroxyphenyl)hexafluoro-propane, polyamine compound (crosslinking agent)

Perhexa 25B: trade name, manufactured by Nippon Oil & Fats, Co., Ltd. 2,5-dimethyl-2,5-di(tert-butylperoxy)hexane, organic peroxide (crosslinking agent)

In Table 1, ">100" in the column of the compression set at high temperature means a value larger than 100%.

It is evident from Table 1 that by using the present composition comprising the copolymer (A) (copolymer (A-1)), the copolymer (B) (copolymer (B-1)) and the crosslinking agent (Ex. 1 to 5 and Ex. 8 to 10), a crosslinked rubber article which has a low compression set at high temperature and which is not broken after compression can be formed.

This application is a continuation of PCT Application No. PCT/JP2021/014996, filed on Apr. 9, 2021, which is based upon and claims the benefit of priority from Japanese Patent Application No. 2020-071455 filed on Apr. 13, 2020. The contents of those applications are incorporated herein by reference in their entireties.

What is claimed is:

1. A fluorinated copolymer composition, comprising:
a fluorinated copolymer (A) which is a perfluoropolymer comprising units having a nitrile group, units based on tetrafluoroethylene, and units based on a perfluoro (alkyl vinyl ether);
a fluorinated copolymer (B), which is different from the fluorinated copolymer (A), comprising units having at least one functional group selected from the group consisting of a carbonate group, a haloformyl group and an acid anhydride group, units based on tetrafluoroethylene, and units based on a perfluoro(alkyl vinyl ether);
a phosphorus compound having a melting point of 60° C. or lower; and
a crosslinking agent having two or more amino groups, wherein
in the fluorinated copolymer (A), the contents of the units having the nitrile group, the units based on the tetrafluoroethylene, and the units based on the perfluoro (alkyl vinyl ether) are from 0.05 to 5 mol %, from 60 to 75 mol %, and from 20 to 36 mol %, respectively, to all units in the fluorinated copolymer (A), in the fluorinated copolymer (B), the contents of the units having the at least one functional group selected from the group consisting of the carbonate group, the haloformyl group and the acid anhydride group, the units based on the tetrafluoroethylene, and the units based on the perfluoro(alkyl vinyl ether) are from 0.05 to 1 mol %, from 96 to 98.95 mol % and from 1 to 3.95 mol %, respectively, to all units in the fluorinated copolymer (B), the fluorinated copolymer (B) has a melting point of from 260° C. to 320° C., a content of the phosphorus compound having a melting point of 60° C. or lower is 0.20 to 5 parts by mass to 100 parts by mass of the fluorinated copolymer (A), a content of the crosslinking agent is from 0.5 to 1.5 parts by mass to 100 parts by mass of the fluorinated copolymer (A), and the content of the fluorinated copolymer (B) is from 10 to 30 parts by mass to 100 parts by mass of the fluorinated copolymer (A), wherein the fluorinated copolymer composition produces a crosslinked rubber article upon crosslinking the fluorinated copolymer (A), and the crosslinked rubber article has a Shore-A hardness of from 73.8 to 80 and a compression set of 25-37%.

2. The fluorinated copolymer composition according to claim 1, wherein the melting point of the phosphorus compound is 35° C. or lower.

3. The fluorinated copolymer composition according to claim 1, wherein the phosphorus compound is a trialkylphosphine or a trialkylphosphine oxide.

4. The fluorinated copolymer composition according to claim 1, wherein:

in the fluorinated copolymer (A), the contents of the units having a nitrile group, the units based on tetrafluoroethylene, and the units based on a perfluoro(alkyl vinyl ether) are from 0.05 to 5 mol %, from 66 to 72 mol %, and from 27 to 33 mol %, respectively, to all units in the fluorinated copolymer (A).

5. The fluorinated copolymer composition according to claim 1, wherein:

in the fluorinated copolymer (A), the contents of the units having a nitrile group, the units based on tetrafluoroethylene, and the units based on a perfluoro(alkyl vinyl ether) are from 0.05 to 5 mol %, from 66 to 75 mol %, and from 20 to 30.3 mol %, respectively, to all units in the fluorinated copolymer (A).

6. A crosslinked rubber article which is obtained by crosslinking a fluorinated copolymer (A) in a fluorinated copolymer composition, wherein the fluorinated copolymer composition comprises a fluorinated copolymer (A) which is a perfluoropolymer comprising units having a nitrile group, units based on tetrafluoroethylene, and units based on a perfluoro (alkyl vinyl ether);

a fluorinated copolymer (B), which is different from the fluorinated copolymer (A), comprising units having at least one functional group selected from the group consisting of a carbonate group, a haloformyl group and an acid anhydride group, units based on tetrafluoroethylene, and units based on a perfluoro(alkyl vinyl ether);

a phosphorus compound having a melting point of 60° C. or lower; and a crosslinking agent having two or more amino groups, in the fluorinated copolymer (A), the contents of the units having the nitrile group, the units based on the tetrafluoroethylene, and the units based on the perfluoro (alkyl vinyl ether) are from 0.05 to 5 mol %, from 60 to 75 mol %, and from 20 to 36 mol %, respectively, to all units in the fluorinated copolymer (A), in the fluorinated copolymer (B), the contents of the units having the at least one functional group selected from the group consisting of the carbonate group, the haloformyl group and the acid anhydride group, the units based on the tetrafluoroethylene, and the units based on the perfluoro(alkyl vinyl ether) are from 0.05 to 1 mol %, from 96 to 98.95 mol % and from 1 to 3.95 mol %, respectively, to all units in the fluorinated copolymer (B), the fluorinated copolymer (B) has a melting point of from 260° C. to 320° C., a content of the phosphorus compound having a melting point of 60° C. or lower is 0.20 to 5 parts by mass to 100 parts by mass of the fluorinated copolymer (A), a content of the crosslinking agent is from 0.5 to 1.5 parts by mass to 100 parts by mass of the fluorinated copolymer (A), and the content of the fluorinated copolymer (B) is from 10 to 30 parts by mass to 100 parts by mass of the fluorinated copolymer (A), and the crosslinked rubber article has a Shore-A hardness of from 73.8 to 80 and a compression set of 25-37%.

7. The crosslinked rubber article according to claim 6, wherein the fluorinated copolymer (B) in the fluorinated copolymer composition has units having an acid anhydride group.

8. The crosslinked rubber article according to Claim 6, wherein the content of the phosphorus compound in the fluorinated copolymer composition is from 0.30 to 1.0 parts by mass to 100 parts by mass of the fluorinated copolymer (A).

9. The crosslinked rubber article according to claim 8, wherein the crosslinking agent in the fluorinated copolymer composition is 2,2-bis (3-amino-4- hydroxyphenyl) hexafluoropropane.

10. The crosslinked rubber article according to claim 9, wherein the phosphorus compound in the fluorinated copolymer composition is a trialkylphosphine or a trialkylphosphine oxide.

11. The crosslinked rubber article according to claim 9, wherein the phosphorus compound in the fluorinated copolymer composition is tri-n- octylphosphine.

* * * * *